Figure 2:
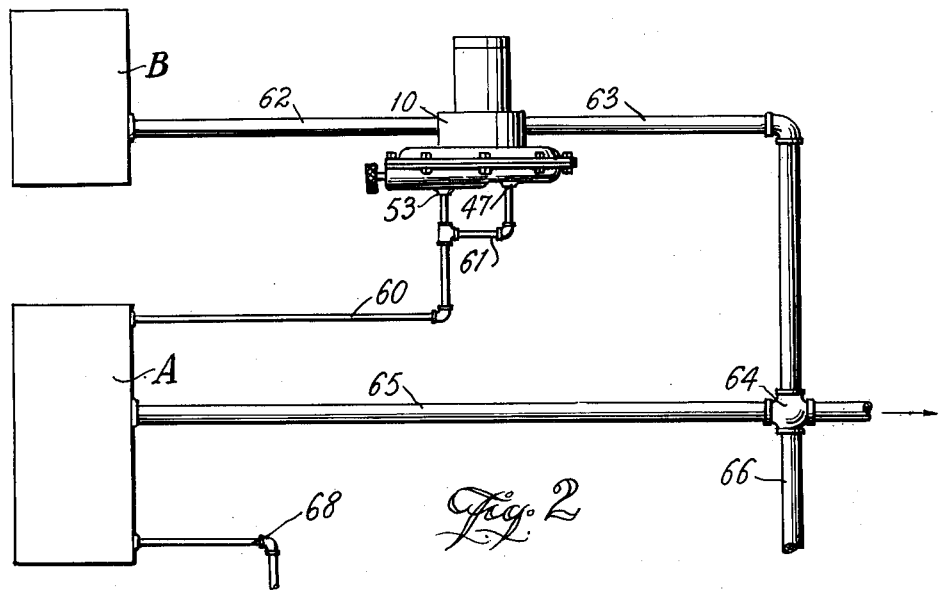

June 10, 1952 J. C. SLONNEGER 2,599,872
VALVE
Filed Dec. 7, 1945

INVENTOR.
John C. Slonneger
BY Jack A. Schley
Joseph H. Schley
ATTORNEYS

UNITED STATES PATENT OFFICE 2,599,872

VALVE

John C. Slonneger, Dallas, Tex., assignor to The Continental Supply Company, Dallas, Tex., a corporation of Delaware Application December 7, 1945, Serial No. 633,367

1 Claim. (Cl. 137—153)

This invention relates to new and useful improvements in valves.

One object of the invention is to provide improved valve means for controlling the flow of fluids, including means directly responsive to pressure differentials which is indirectly controlled by dampening means set to a selected or predetermined value, whereby fluids may be metered or supplied at rates in accordance with varying demands.

A further object of the invention is to provide an improved metering valve for fluids having means actuated by a pressure differential and adjustable dampening means, whereby the metering of a flowing fluid is controlled by the frequency of vibrations of the pressure fluid actuated means in accordance with the setting of the dampening means.

Still another object of the invention is to provide improved valve means wherein the valve is opened in response to a pressure differential acting thereon, together with means for automatically holding said valve open and controlling the amplitude or range of the open phase in accordance with variations in the flow demand imposed upon the valve, whereby a fluid flowing through the valve is metered accordingly and the frequency of vibration of the valve is controlled.

A still further object of the invention is to provide an improved valve wherein excessive opening and closing of the valve, "chattering" or self-induced vibrations, under conditions comparable with those under which valves of its class operate, are substantially eliminated, whereby undue wear and inaccurate metering or control are excluded.

Another object of the invention is to provide an improved valve for an internal combustion engine having means for controlling the supply of fuel fluid thereto responsive to the suction impulses or cycles of the engine and automatic dampening means which is manually adjustable to predetermine the response to engine demands, whereby the amplitude of the open phase of the valve is automatically controlled by the load and speed demands of the engine so that fuel fluid is supplied or metered and also whereby, while the valve is responsive to the suction period of a cycle of the engine, its open phase or the amplitude of the open phase is not limited to the duration of such suction period, thus providing for substantially ideal fuel mixture ratios and efficient and smooth operation.

A construction designed to carry out the invention will be hereinafter described together with other features of the invention.

Figure 1:
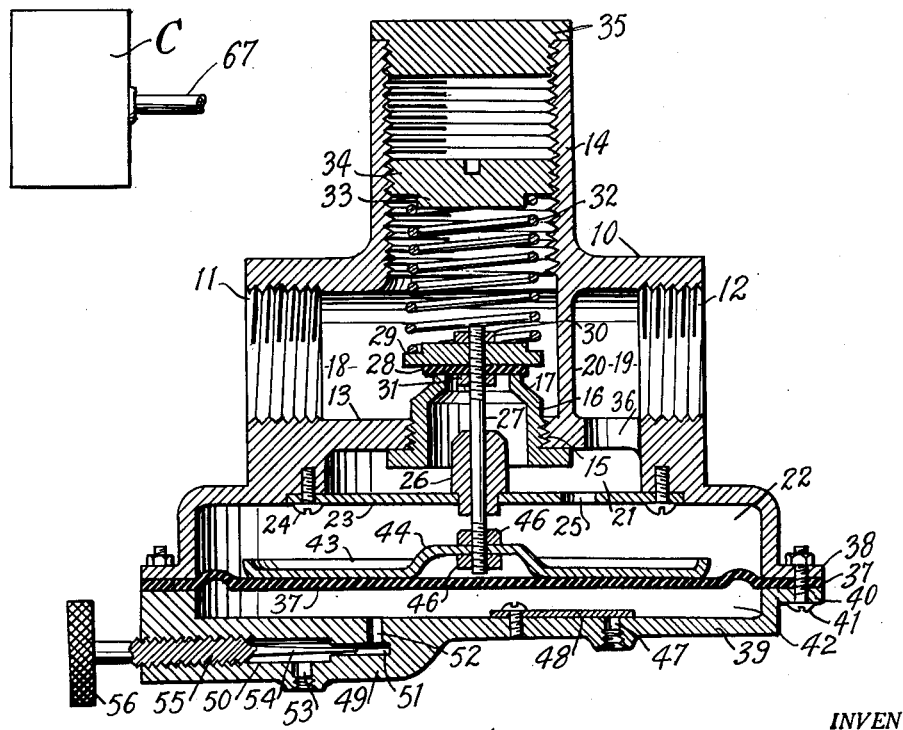

The invention will be more readily understood from a reading of the following specification and by reference to the accompanying drawing, wherein an example of the invention is shown, and wherein:

Fig. 1 is a vertical sectional view of a valve constructed in accordance with the invention, and Fig. 2 is a diagrammatical view showing the valve connected in a multiple reservoir system.

In the drawings, the numeral 10 designates an annular valve case having an internal screw-threaded inlet 11 and an outlet 12, with a partition 13 extending therebetween. An upstanding neck 14 extends from the medial portion of the case. Below the neck the partition is provided with a screw-threaded aperture 15 which receives a flanged seat bushing 16. The bushing is reduced at its upper end to form a seat 17. Above the partition is an inlet passage 18 extending inwardly from the inlet 11 to the seat. The inlet passage is separated from an outlet passage 19 by a cross wall 20 adjacent the bushing.

Below the partition 13, the case is formed with an annular chamber 21, below which the case is enlarged to form a second and larger annular chamber 22. The chambers are separated by a disk or plate 23, countersunk in the top of the chamber 22 and secured by machine screws 24. Communication between the chambers is maintained through a port 25 in the plate. A valve-stem guide 26 has its lower end reduced and secured in the plate 23. A valve stem 27 is mounted to slide in the bushing and extends upwardly through a valve disk 28 and a flanged valve disk 29. The upper end of the stem is screw-threaded and receives a nut 30, which confines the head and disk against a collar 31 fastened on the stem. The disk is made of synthetic rubber or other suitable material, so as to seal on the seat 17, which it overhangs. The elements 28 and 29 constitute a valve head.

For yieldably holding the valve head to its seat, the lower end of a coiled spring 32 engages around the disk 29; while the upper end of the spring engages around a boss 33 depending from an adjusting nut 34. The neck 14 is internally screw-threaded and the nut is screwed therein for compressing the spring. The upper end of the neck is closed by a cap 35. When the valve head is lifted from its seat a fluid entering the inlet 11 may flow by way of the passage 18, through the bushing 16 into the chamber 21, thence by way of an opening 36 into the passage 19 and escape through the outlet 12.

The invention has largely to do with means for opening and closing the valve and governing the amplitude of movement of the valve during its open phase. For this purpose, a flexible diaphragm 37 is provided across the bottom of the chamber 22. The case has a marginal flange 38 at its bottom and a dished cover 39 is provided with an annular flange 40, secured to the flange 38 by bolts and nuts 41; the margin of the diaphragm being secured between said flanges. The dished cover forms a third chamber 42 below the diaphragm. The upper surface of the diaphragm abuts the under surface of a flanged disk 43, which has an upset boss 44 at its center through which the lower screw-threaded end of the valve stem 27 passes, whereby a pair of nuts 46, screwed onto said stem, fasten the disk thereto.

The cover plate has an internally screw-threaded port 47, open at its outer end to the atmosphere and normally closed at its inner end by a feather valve 48 in the chamber 42. If a vacuum or suction is exerted through the outlet opening 12 and passage 19, the pressures in the chambers 21 and 22 will be equalized, the valve head being seated. If the suction is sufficient to overcome the compression of the spring 32, the diaphragm 37 will be lifted up and the valve opened.

When the diaphragm is lifted, the feather valve 48 will be opened and a certain amount of air drawn into the chamber 42. This air will be trapped in the chamber 42 when the suction acting upon the diaphragm drops enough to permit the spring 32 to start moving said diaphragm downwardly, because the valve 48 will be closed. In this event, the diaphragm would not reach its normal low position and the valve head will thus be held open; however, if the air was permitted to gradually escape from the chamber 42, the closing of the valve would be throttled or dampened.

The cover plate 39 is formed with a depending radial boss 49, extending to its outer edge and provided with a partially screw-threaded axial bore 50 terminating at a counterbore 51 having a port 52 communicating with the chamber 42. An internally screw-threaded port 53 extends from the bore 50 through the bottom of the boss and is open to the atmosphere.

From the foregoing, it will be seen that any air which may be trapped in the chamber 42 would escape through the port 52, bores 51 and 50 and port 53, unless obstructed. A needle valve 54 has a screw-threaded shank 55 engaging in the threads of the bore 50 and is provided on its outer end with a knurled head 56. The needle valve extends into the counterbore 51 and reduces the passage therethrough and by adjusting this valve, the escape of trapped air is controlled or throttled.

It is pointed out that once the valve is opened to its limit, its closing may be definitely controlled by an adjustment or setting of the needle valve 54. Thus, variations in pressures in the chambers 21 and 22, when the valve is open, may be reflected in the consequent dampening of the closing movement of the diaphragm 37 under the control of the needle valve 54 and expansion of the spring 32. Since the frequency of the variations in pressures acting in the chambers 21 and 22 upon the diaphragm may occur at a higher rate than the rate of the escape of trapped air by the needle valve, the valve 28 may not reach a fully closed position and thus, a metering of a fluid flowing through the valve, from inlet 11 to outlet 12, is accomplished; however, when the spring force overcomes the force acting upwardly on the diaphragm, the valve will close at a rate determined by the setting of the needle valve which controls the rate of escape of air from the chamber 42 or dampens the closing action of the valve.

The invention is particularly adaptable for use in supplying a fuel gas to the mixing chamber of an internal combustion engine, whereby an air and gas mixture is provided. For efficient and smooth operation of the engine, it is desirable that ideal mixtures under varying speeds and loads of the engine be supplied and the metering valve herein set forth is capable of providing such mixtures. The suction period or the endurance of such suction, in the intake of a single cylinder four cycle internal combustion engine, is approximately one-third of a cycle, during the remainder of such cycle there is little or no suction or difference of pressure sufficient to cause a movement of the fuel fluid to the engine. In the ordinary design of metering valve for fuel gas, which is now in common use, the valve opens near the beginning of the suction period and closes at the end thereof. This results in repeated or excessive opening and closing of the metering valve, which causes rapid wear of such valves and their springs often produce "chattering" or self-induced vibrations; thus, the valve may be opened and closed several times during each suction period, which increases the wear and frequently interferes with the accurate supplying of the fuel gas and the proper admixture of the gas and air.

The valve herein set forth overcomes these difficulties by causing the metering valve to remain open so long as the suction impulses have a higher frequency than the dampened frequency of the valve mechanism. This dampened frequency of the valve mechanism may be so designed and adjusted, that such frequency is lower than the practical minimum frequency of the suction impulses, which latter depend upon the practical minimum operating speed of the engine to which fuel is supplied. In actual practice, the metering valve herein set forth opens when the engine is started and may remain open to some degree until the engine is stopped; which degree will depend upon the maximum suction of the suction cycle, as well as upon the adjustment of the needle valve, necessary to provide the correct ratio of fuel gas-to-air. This will result in less frequent opening and closing of the valve and will reduce wear to a minimum, as well as assuring proper fuel ratios.

It is obvious that if the needle valve 54 was adjusted to entirely close the port 53, the valve head would not close, because when the diaphragm 37 was lifted to open the valve, air would be drawn into the chamber 42 and trapped upon the closure of the valve 48. Consequently, the rate at which the valve head closes depends upon the rate of escape of trapped air, which is controlled by adjustment of the needle valve and this, is turn, controls the metering action of the valve. The needle valve may be so adjusted that the metering valve will not entirely close between suction impulses or to not close until after the cessation of the suction impulses.

In operating the valve with an internal combustion engine, the needle valve 54 is slightly opened while the engine is under substantially no load, and the compression of the spring 32 is varied by the adjusting of the nut 34 until the engine is operating smoothly, thus indicating a desirable ratio of gas-to-air. A load is then placed upon the engine and the needle valve 54 adjusted so that the proper mixture of gas and air is obtained. Wherever the suction reaches a peak value, the diaphragm 37 will be lifted in accordance therewith, whereby the maximum amount of fuel gas will be supplied. As the suction falls off, the spring 32 will tend to close the valve and the rate of closing will be controlled through the dampening effect secured by the throttled escape of the trapped air through the port 53. It is obvious that at higher speeds the frequency of the suction impulses will increase, thereby decreasing the amplitude of the vibration of the metering valve, thus increasing the rate of gas flow through the valve, which is necessary for the increased speed.

The valve may be used for the admixture of a plurality of fluids and I have shown in Fig. 2 an arrangement for this purupose. The letters A, B and C designate sources of fluids to be admixed, which fluids are under some pressure other than atmosphere and usually nearly equal to each other. If the pressures are unequal, then the pressure in A must be the least of the three. The outlet 53 of the chamber 42 is connected with a pipe 60, which, in turn, has connection with the inlet 47 by a branch pipe 61. The pipe 60 is connected with the source A. The source B is connected with the inlet 11 of the valve case 10 by an inlet pipe 62, while the outlet 12 is connected with a pipe 63, which in turn is connected in a T 64. A pipe 65 leading from the source A is also connected with said T and leads to the intake of a pump. Whenever the pressures are equalized across the diaphragm 37 and there is no flow from sources A and B, the valve head will remain closed. Whenever fluid flows from the source A, the differential of pressure causing this flow, acting through the pipe 63, will open the valve. As the suction declines and the spring 32 moves the valve 28 toward a closing position, a decreased pressure in the source A will act to throttle or dampen the closing action of the valve. The T 64 may be connected by a pipe 66 with a second metering valve (not shown) having connection with the source C by a pipe 67 and with the source A by a pipe 68.

It is to be understood that the invention is not to be limited to use with gaseous fluids, and the term "fluid" as herein employed is intended to cover liquids as well as air and gas. This valve is particularly advantageous in use with internal combustion engines because of its overall supply of fuel. At idling speeds, the intake suction is greatly reduced from that at peak loads and therefore, a device which will proportionately meter the fuel under the varying conditions of speed and load will produce more efficient and smoother operation.

It is pointed out that while the element 48 has been shown and described as a feather or flap valve, it is to be understood that any suitable form of valve may be used. It is also to be noted that the rate of opening of the valve depends upon the cross-sectional area of the orifice 47 and the adjustment of the needle valve 54 but the rate of closing of the valve depends entirely upon the adjustment of said needle valve; however, the rate of opening must be greater than the rate of closing under similar conditions of pressure differences.

Under some operating conditions the cross-sectional area of the orifice 25 would be immaterial and, therefore, so long as the guide 26 is adequately supported, the orifice could be omitted provided there was communication between the chambers 21 and 22. Under other operating conditions, however, the orifice 25 may be employed to establish a maximum rate of opening for pressure differentials. If the orifice 25 should have a greater cross-sectional area than the cross-sectional area of the flow space provided by adjustment of the needle valve 54, but less than the cross-sectional area of the orifice 47, then the rate of opening of the valve would depend upon the escape of fluid through the orifice 25 rather than the rate at which the fluid entered through the openings 47 and 52 because the opening 25 would offer the greater restriction. The closing of the valve would depend upon the adjustment of the needle valve since it offers greater restriction to the flow of fluid than does the opening 25. The above arrangement is useful in preventing "standing wave" in the pipe system, to which the valve is attached, from interfering with accurate metering. A small opening at 25 prevents any relatively large amount of energy from the standing wave from entering the chamber 22. The relatively small amount of energy so entering chamber 22 would be quickly dissipated by the dampening action herein referred to and the position of the diaphragm 37 will remain substantially the same as if no standing wave existed. The cross-sectional area of the orifice 25, therefore, determines the rate of energy entering the chamber 22 for actuating the diaphragm 37 under a given condition of pressure differential.

The foregoing description of the invention is explanatory thereof and various changes in the size, shape and materials, as well as in the details of the illustrated construction may be made, within the scope of the appended claim, without departing from the spirit of the invention.

What I claim and desire to secure by Letters Patent is:

The combination with a pressure fluid regulator having a regulator case with a flow passage therethrough provided with a seat, a valve engaging said seat, a spring in the case engaging said valve for closing it, a diaphragm connected with the valve for operating same, one side of said diaphragm being exposed to the flow passage, the opposite side of the diaphragm being enclosed by a cover plate, of a check valve means communicating with the cover plate enclosed side of the diaphragm for admitting fluid to that side of the diaphragm, a fluid outlet in the cover plate, and means for controlling the escape of fluid through said fluid outlet, the check valve means and the fluid outlet being exposed to a source of fluid other than that flowing through the regulator flow passage.

JOHN C. SLONNEGER.

REFERENCES CITED

The following references are of record in the file of this patent:

UNITED STATES PATENTS

| Number | Name | Date |
| --- | --- | --- |
| 415,863 | Fahy | Nov. 26, 1889 |
| 770,984 | Roake | Sept. 27, 1904 |
| 1,213,463 | Dalen | Jan. 23, 1917 |
| 1,706,861 | Pokorny | Mar. 26, 1929 |
| 1,861,742 | Hand | June 7, 1932 |
| 1,923,127 | Veeschoten | Aug. 22, 1933 |
| 2,047,101 | Grove | July 7, 1936 |
| 2,164,095 | Thomes | June 27, 1939 |
| 2,216,296 | Raymond | Oct. 1, 1940 |
| 2,288,733 | Niesemann | July 7, 1942 |
| 2,402,500 | Lawrence | June 18, 1946 |

FOREIGN PATENTS

| Number | Country | Date |
| --- | --- | --- |
| 178,232 | Germany | of 1906 |